G. M. MARSHALL.
SUBMARINE DETECTOR.
APPLICATION FILED JAN. 3, 1918.
1,353,410. Patented Sept. 21, 1920.
3 SHEETS—SHEET 1.
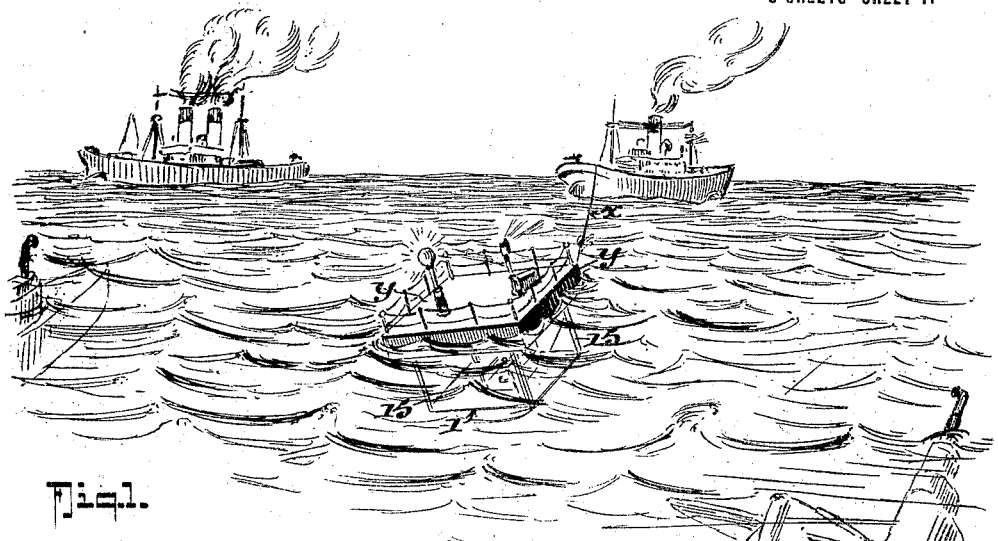
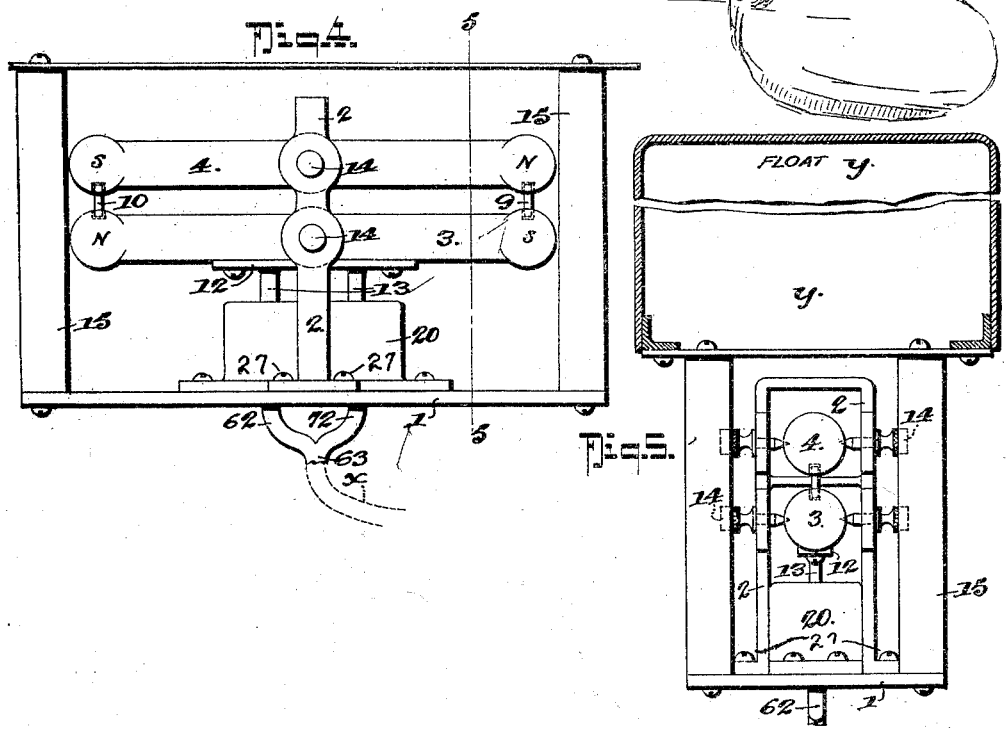
INVENTOR
George M. Marshall.
BY
Fred G. Dieterich
ATTORNEYS G. M. MARSHALL.
SUBMARINE DETECTOR.
APPLICATION FILED JAN. 3, 1918.
1,353,410.
Patented Sept. 21, 1920.
3 SHEETS—SHEET 2.
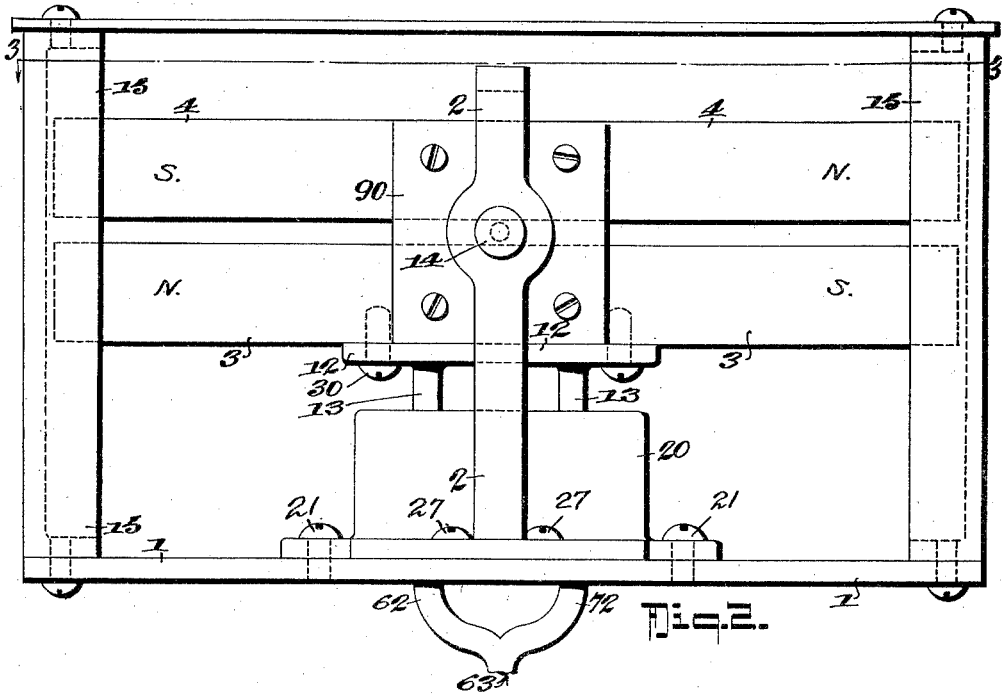
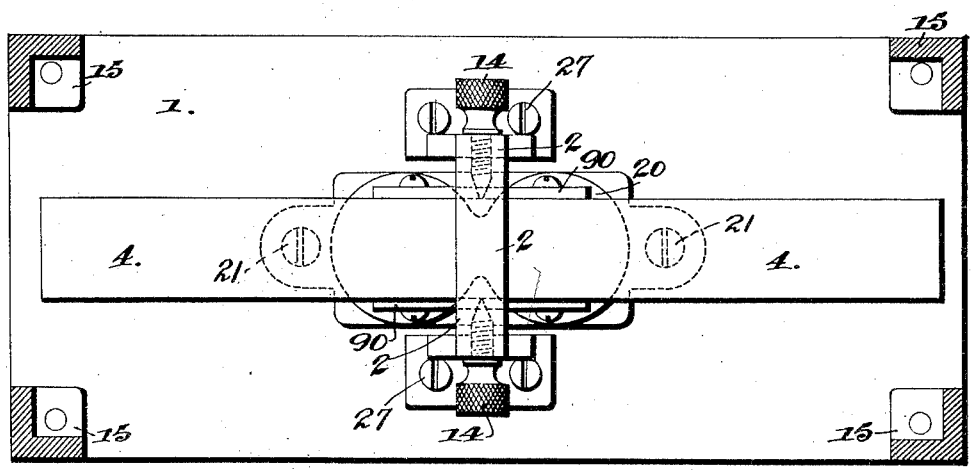
INVENTOR
George M. Marshall.
BY
Fred G. Dieterich
ATTORNEYS G. M. MARSHALL.
SUBMARINE DETECTOR.
APPLICATION FILED JAN. 3, 1918.
1,353,410.
Patented Sept. 21, 1920.
3 SHEETS—SHEET 3.
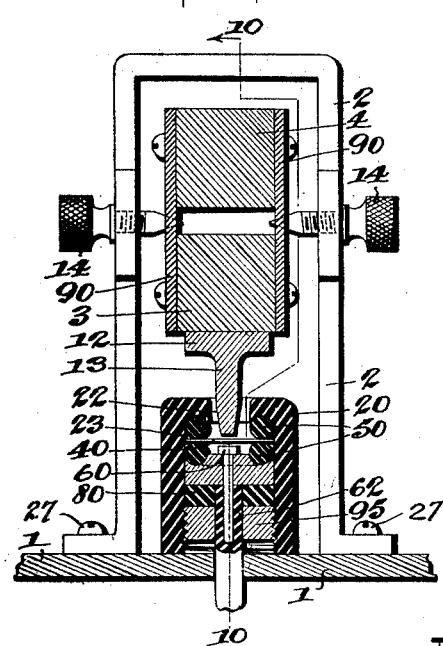
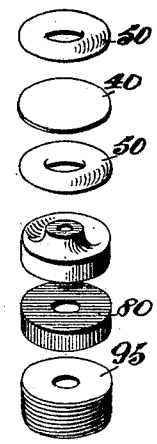
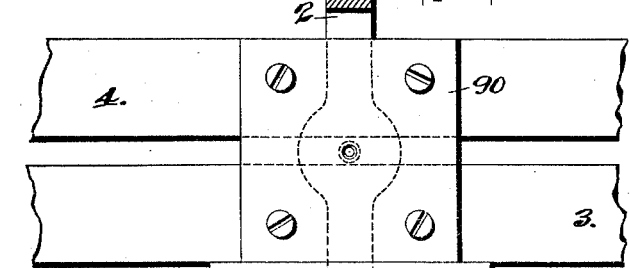
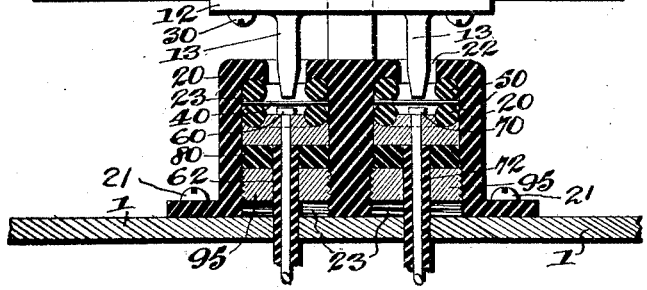
INVENTOR
George M. Marshall.
BY
Fred G. Dieterich & Co.
ATTORNEYS

UNITED STATES PATENT OFFICE.

GEORGE MILLER MARSHALL, OF LAKE FRANCIS, MANITOBA, CANADA.

SUBMARINE-DETECTOR.

1,353,410.  Specification of Letters Patent.  Patented Sept. 21, 1920.

Application filed January 3, 1918. Serial No. 210,194.

*To all whom it may concern:*

Be it known that I, GEORGE MILLER MARSHALL, a citizen of the Dominion of Canada, residing at Lake Francis, in the Province of Manitoba, Canada, have invented a new and Improved Submarine-Detector, of which the following is a specification.

This invention relates to improved means for locating or detecting sub-marines; its primary object is to warn or notify an operator by signals, audible or visual, whether the said operator be on shore or on ship board, that a sub-marine is passing a given point.

The improved detector means may be applied to a support held stationary at the entrance of a harbor, in a danger zone formed of one or more vessels, or connected with a float that may be fed out from the vessel to a desired distance.

In its more specific nature, my present invention has reference to improvements on the type of sub-marine detector disclosed in my copending application filed September 13, 1917, Serial No. 191,191.

In my copending application, the construction of the detector mechanism is such that the magnetic needle or member sensible to the passing of a sub-marine within a limited distance therefrom, is held separated from the water, necessitated by the use of an outer cover or container within which the magnetic element is supported; or in other words, an air space separates the needle or magnetic member from the water.

In further development of the type of sub-marine detector devices disclosed in my copending application, I have found that by reason of the magnetic elements being held spaced from contact with the water, the pull of the earth's field on the magnetic element, the needle, by attraction, tends to negative the magnetic influence of the passing armed mass, the sub-marine, on the said needle.

As the permeability of water is many times greater than that of air, I have endeavored, with the said fact in view, to provide an improved arrangement of the magnetic elements, whereby to present them in direct contact with the water, to thereby establish a water medium of high permeability between the magnet combination and the sub-marine.

Another and essential feature of my present invention is the provision of an improved arrangement of a plurality of magnetic elements, including pairs of magnetic needles or members mounted in reverse relationship to one another and so arranged whereby to overcome the pulling tendency of the earth's field on the magnet elements movable under the influence of a passing sub-marine, the reverse relationship of the said magnet elements serving for establishing equilibrium between the magnets held in suspension and for creating a local field of great magnetic strength, sufficient for freeing the magnets from the earth's attraction, so that they may remain sufficiently sensitive for being easily acted upon by a mass of iron, such as a sub-marine.

The invention is illustrated in the annexed drawings where

Figure 1 is a perspective view of my improved sub-marine detector, the same being shown as in use and as being influenced by a passing sub-marine.

Fig. 2 is a side elevation, parts being in section, of a preferred construction of the plurality of pivoted magnet members, the means for coupling them to cause them to move together and a preferred construction of the terminals for the electric circuit that is brought into action under the swing of the pivoted magnet members.

Fig. 3 is a plan view thereof, parts being in horizontal section, taken on the line 3—3 on Fig. 2.

Fig. 4 is a side view partly in section of a pair of magnet needles or members and shows a modified means for securing them in fixed relation.

Fig. 5 is a transverse section thereof taken on the line 5—5 on Fig. 4, the float frame being also shown in this view.

Fig. 6 is a cross section of a preferred form of one of the terminals for the electric circuit wires.

Fig. 7 is a view in perspective showing the several parts of the terminal illustrated in Fig. 6, as separated.

Fig. 8 is a longitudinal section of the preferred construction taken substantially on the line 10—10 on Fig. 6.

In carrying out my present invention, I provide a base plate 1 upon which, in a central position, is secured, by screws 27—27, a standard 2, which, as also the base plate, is preferably made of aluminum.

3 and 4 designate a pair of parallel magnetic members, hereinafter termed needles, and these are arranged in vertical alinement, supported between the opposite side arms of the standard 2 and are balanced on the pivot screws 14—14, as is best shown in Fig. 5. The needles 3 and 4 are of steel and are highly magnetized. The pivot screws are preferably of brass.

To keep the pole ends of the needles equidistant apart, distance pieces 9 and 10, preferably brass, may be used with their ends engaging sockets in the opposite pole ends, as shown in the modified form Fig. 4, or the said distance pieces may be brass plates 90 screwed onto the needles 3 and 4, as shown in the structural Figs. 2, 3, 6 and 8.

As before stated, in the practical application of magnetic needle devices for detecting sub-marines, the earth's field or attraction force must be overcome to render available magnetic influence of a heavy metal mass, such as a sub-marine, for effecting movement of the needles.

By my present invention, I have endeavored to overcome the said earth's field by placing one magnet above another of equal strength and passing the pole ends of the said magnets, (the needles) in reverse relationship, see Fig. 2; or in other words, having the north pole ends facing or adjacent the south pole ends, thus establishing equilibrium between the suspended magnets.

Positioned midway the lower magnet 3, and attached thereto by screws 30—30, is a metal plate 12 having a pair of dead terminals or pusher fingers 13—13, one at each side of the pivot axis of the magnets 3 and 4. Coöperative with the terminals or pusher fingers 13 are live terminals 60—70 that join with the electric circuit wire or conductor in the manner best shown in Figs. 6 and 8, by reference to which it will be seen the terminals 60—70 are located in a housing 20, that is secured to the base plate 1 by lag screws 21—21.

The top of the housing 20 has a pair of apertures 22—22 into which the dead terminals or fingers 13—13 are normally projected and each aperture 22 communicates with a circular socket 23 that extends through the bottom of the housing.

Coöperative with each finger 13 is a disk diaphragm 40 preferably of spring brass but may be of spring steel.

Each disk 40 is normally held close up to but out of contact with the respective fingers 13—13, by rubber gaskets 50—50, which along with the disks 40 serve the purpose of spring push buttons.

The terminal elements 60—70 with the conductors 62—72 attached are placed in the housing sockets with the terminal heads close up to the disks 40 and the said conductors 62—72 are sealed up by pouring into the housing sockets, a suitable insulation 80, the latter with the terminals the disks 40 and the gaskets 50—50 being securely held in place by threaded plugs 95—95 centrally apertured for the passage of the conductor portions 62—72, as shown.

The plugs 95—95 are also intended to take the strain of the anchorage indicated by $x$, which is suspended by the cable 63 (Figs. 1 and 4), it being understood the base plate 1 is suitably apertured for passing the conductor ends 62—72 therethrough.

15—15 designate standards attached to the ends of the base plate 1; the upper ends of the said standards are attached to the base of a float $y$, as is indicated in Figs. 1 and 5.

The conductor ends 62 and 72, after they pass below the base plate 1 are brought together and receive the outer covering or insulator tube, as shown.

As my improved sub-marine detector means, when practically applied, is located some distance from the shore or the ship, the electric cable is of necessity formed of a number of sections and these are coupled together by suitable coupling devices.

From the foregoing taken in connection with the drawings, the complete construction, the general operation and the advantages of my present invention will be clear to those skilled in the art to which my invention relates.

To operate the magnet combination, it is necessary for the magnetic attraction exerated by a passing mass of iron, such as a sub-marine, to come within range of the influence of the magnet members or needles, when either end of the said combination of magnets may be rocked or pulled down to bring one of the dead terminals 13 into electrical contact with a corresponding live terminal, thus completing an electrical circuit, which causes a bell to ring or a light to show in a signal station on shore or on board a ship, thereby announcing the instant of time of passage of the sub-marine at a given point and enabling the operator on shore or ship board to transmit wireless calls announcing the nerve center operated and the instant of time of sub-marine detection or location.

What I claim is:

1. In a sub-marine detector, a float, a hanger frame attached thereto, a pair of magnet members, means for fixedly holding them in parallel relation, other means for pivotally suspending the said magnet members on the hanger frame, a pair of terminals on the magnet members, one at each side of the pivotal axis thereof, electric circuit terminals attached to the hanger frame for being engaged by either of the terminals on the magnets as the latter are caused to swing on their axis under the magnetic influence of a passing sub-marine.

2. In a sub-marine detector, a float, a hanger frame attached thereto, a pair of magnet members, means for fixedly holding them in parallel relation, other means for pivotally suspending the said magnet members on the hanger frame, a pair of terminals on the magnet members, one at each side of the pivotal axis thereof, electric circuit terminals attached to the hanger frame for being engaged by either of the terminals on the magnets as the latter are caused to swing on their axis under the magnetic influence of a passing sub-marine, and flexible push button elements between the opposing faces of the magnet and the electric circuit terminals.

3. In a submarine detector in which is included a float, a hanger frame attached thereto, a pair of magnet members held in parallel relation, and pivotally suspended on the hanger frame, the said pair of magnet members including a pair of terminals, one of which is at each side of the pivotal axis of the magnetic members, electric circuit having terminals attached to the hanger frame for being engaged by either of the terminals on the magnets as the latter are caused to swing on their axis under the magnetic influence of a passing sub-marine, flexible push button elements between the opposing faces of the magnet and the circuit terminals, the said push button elements comprising a spring metal diaphragm, cushion rings between which the said diaphragm is held and a housing having pockets for receiving the said push button elements, means for securing the terminal ends of the pockets and other means for securing the housing on the hanger frame, the said housing pockets each having an aperture above the push button elements through which the terminals on the magnets are normally projected.

4. In a submarine detector, at least one magnetic element, means for supporting the element in direct contact with the water thereby establishing a water medium of high permeability between the element and a submarine, a normally open electric circuit terminal and means for causing the element to engage the said circuit terminal when influenced by a submarine.

5. In a submarine detector, at least one magnetic needle, means for supporting the needle wholly immersed and in direct contact with the water, other means for normally maintaining the needle in a substantially horizontal position and for causing it to complete an electric circuit to give a signal when energized and moved by an attracting body.

6. A submarine detector circuit closer comprising a plurality of magnetic members arranged in series and movable in unison, means for supporting said members in direct contact with the water, at least one electric circuit terminal, and at least one terminal carried by the magnetic members adapted to close on to the electric circuit terminal when the magnetic members are influenced and moved by a passing object.

7. In a submarine detector, a float, a magnetic member in direct contact with the water, a support therefor pendent from the float, an electric circuit terminal arranged in the path of movement of the magnetic member when the said member is shifted by the attraction of a metal mass.

8. A submarine detector circuit closer comprising at least one magnetic needle, means for pivotally supporting the needle in an immersed position in direct contact with the water, means for causing the said needle to complete an electric circuit when the needle is moved under magnetic attraction of a passing metal mass.

9. In a submarine detector, a float, a support pendent from the float, magnetic elements carried by the support and arranged wholly immersed in reverse relationship to one another to overcome the pulling tendency of the earth's field thereon, means for causing the elements to close a circuit when moved by an attracting body.

10. In a submarine detector, magnetic elements arranged wholly immersed in reverse relationship to one another to create a local field for freeing the elements from the earth's attraction and to establish a water medium of high permeability between them and a submarine, means for supporting the elements, means for closing a circuit when the elements are moved under the influence of a submarine.

11. In a submarine detector, a plurality of magnetic elements arranged astatically and movable in unison, means for supporting the elements wholly immersed, at least one electric circuit terminal, and at least one co-acting terminal carried by the magnetic elements adapted to close on to the circuit terminal when the elements are influenced and moved by a submarine.

12. In a submarine detector, means for closing an open electric circuit to cause a signal to be given, the said means comprising a submerged and totally immersed magnet combination including a plurality of magnetic needles relatively so connected whereby to create a local field for freeing the magnet combination from the earth's attraction and to establish a water medium of high permeability between a submarine and the magnet combination, and terminals for closing the circuit when the combination is moved under the influence of a submarine.

13. In a submarine detector, means for closing an electric circuit to cause a signal to be given, the said means comprising a submerged and totally immersed magnet combination including a plurality of magnetic needles relatively so connected, whereby to create a local field for freeing the magnet combination from the earth's attraction and to thereby establish a water medium of high permeability between a submarine and the magnet combination, the plurality of needles including a pair of pivotally suspended magnets placed one above another, of equal strength, with the pole ends of one magnet in reverse relationship to the pole ends of the other magnet, and terminals for closing the circuit when the magnet combination is moved under the influence of a submarine.

GEORGE MILLER MARSHALL.